US012687226B1

(12) United States Patent
Menheere et al.

(10) Patent No.: US 12,687,226 B1
(45) Date of Patent: Jul. 21, 2026

(54) VARIABLE-SPEED EPICYCLIC GEARBOX FOR AN AIRCRAFT PROPULSION SYSTEM

(71) Applicant: Pratt & Whitney Canada Corp., Longueuil (CA)

(72) Inventors: Dave Menheere, Norval (CA); Russell Stratton, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/204,129

(22) Filed: May 9, 2025

(51) Int. Cl.
| | |
|---|---|
| *F16H 61/66* | (2006.01) |
| *B64D 35/02* | (2006.01) |
| *F16H 1/28* | (2006.01) |
| *F16H 57/037* | (2012.01) |
| *F16H 57/02* | (2012.01) |

(52) U.S. Cl.
CPC ............. *F16H 61/66* (2013.01); *B64D 35/02* (2013.01); *F16H 1/28* (2013.01); *F16H 57/037* (2013.01); *F16H 2057/02043* (2013.01)

(58) Field of Classification Search
CPC .......... F16H 61/66; F16H 1/28; F16H 57/037; F16H 2057/02043; F16H 2057/02078; B64D 35/02
See application file for complete search history.

(56) References Cited

U.S. PATENT DOCUMENTS

| | | | |
|---|---|---|---|
| 3,202,012 A | 8/1965 | Jania | |
| 7,802,757 B2 * | 9/2010 | Dooley | ................... F01D 15/10 |
| | | | 60/788 |
| 10,710,735 B2 | 7/2020 | Murrow | |
| 11,703,091 B2 | 7/2023 | Bartolomeo | |
| 2018/0135524 A1 * | 5/2018 | Sheridan | ................. F04D 19/02 |
| 2018/0335117 A1 * | 11/2018 | Isono | .................. F16H 37/0826 |
| 2020/0300340 A1 * | 9/2020 | Desjardins | ................ F16H 1/28 |
| 2021/0229796 A1 * | 7/2021 | Mitrovic | ................ B64D 27/10 |
| 2021/0404548 A1 * | 12/2021 | Sheppard | .............. F16H 57/082 |
| 2022/0212807 A1 * | 7/2022 | Wang | ..................... F16H 57/02 |
| 2022/0325781 A1 * | 10/2022 | Sten | ........................... F16H 3/54 |
| 2023/0142715 A1 * | 5/2023 | Hrubec | ..................... F02C 7/36 |
| | | | 415/122.1 |

* cited by examiner

*Primary Examiner* — Farhana Pervin
(74) *Attorney, Agent, or Firm* — Getz Balich LLC

(57) ABSTRACT
An aircraft propulsion system includes a gearbox including an input shaft, an output shaft, an epicyclic gear arrangement, a drive gear, a layshaft assembly, and a rotational control device. The epicyclic gear arrangement includes a sun gear, planet gears, a ring gear, and a carrier. The sun gear is connected with the drive gear. The planet gears are engaged with the sun gear and the ring gear. The carrier is mounted on planet gears and connected to the output shaft. The layshaft assembly extends along an axis. The layshaft assembly is engaged with the drive gear and the input shaft. The rotational control device includes a drive assembly coupled with the layshaft assembly. The drive assembly includes a ring gear drive. The ring gear drive is rotatable about the axis. The drive assembly is configured to drive rotation of the ring gear with the ring gear drive.

20 Claims, 9 Drawing Sheets

VARIABLE-SPEED EPICYCLIC GEARBOX FOR AN AIRCRAFT PROPULSION SYSTEM

BACKGROUND

1. Technical Field

The present disclosure relates to aircraft propulsion systems in general, and to aircraft propulsion system gearboxes in particular.

2. Background Information

Turboprop engines typically employ variable pitch propellers that permit the propeller pitch to be adjusted during phases of an aircraft mission. Different propeller rotation speeds may also be used for different phases of an aircraft mission. The power turbine of the turboprop engine is connected to the propeller and the speed of the power turbine may be dictated by the propeller. Various gearbox configurations are known in the art for coupling the power turbine of a propulsion system with its propeller. While these known gearbox configurations may be suitable for their intended purposes, there is always room in the art for improvement.

SUMMARY

According to an aspect of the present disclosure, an aircraft propulsion system includes a thermal engine, a gearbox, and a propulsion unit. The gearbox includes an input shaft, an output shaft, an epicyclic gear arrangement, a drive gear, a first layshaft assembly, and a ring gear rotational control device. The input shaft is driven by the thermal engine. The epicyclic gear arrangement includes a sun gear, a plurality of planet gears, a ring gear, and a carrier. The sun gear is connected with the drive gear. The plurality of planet gears are engaged with the sun gear and the ring gear. The carrier is mounted on the plurality of planet gears. The carrier is connected to the output shaft. The first layshaft assembly extends along a first layshaft rotational axis and including a first layshaft and a first layshaft input gear. The first layshaft input gear is engaged with the drive gear and the input shaft. The ring gear rotational control device includes a first variable drive assembly coupled with the first layshaft. The first variable drive assembly includes a first ring gear drive engaged with the ring gear. The first ring gear drive is rotatable about the first layshaft rotational axis. The first variable drive assembly is configured to drive rotation of the ring gear with the first ring gear drive. The propulsion unit is driven by the output shaft.

In any of the aspects or embodiments described above and herein, the first variable drive assembly may be configured to operate in a selected gear ratio of a continuous range of gear ratios between a maximum gear ratio of the first variable drive assembly and a minimum gear ratio of the first variable drive assembly, and the continuous range of gear ratios may be defined between the first layshaft and the first ring gear drive.

In any of the aspects or embodiments described above and herein, the maximum gear ratio may be greater than 2:1 and the minimum gear ratio may be less than 2:1.

In any of the aspects or embodiments described above and herein, the first ring gear drive may circumscribe and be radially spaced from the first layshaft.

In any of the aspects or embodiments described above and herein, the first variable drive assembly may further include a plurality of inner disks and a pivoting arm assembly, the plurality of inner disks may be disposed on the first layshaft, the pivoting arm assembly may include a radially fixed gear assembly and a radially variable gear assembly, the radially fixed gear assembly may be rotatable about a first axis radially fixed relative to the first layshaft rotational axis, the radially fixed gear assembly may include a first gear engaged with the first ring gear drive, the radially variable gear assembly may be rotatable about a second axis radially moveable relative to the first layshaft rotational axis, the radially variable gear assembly may include a plurality of outer disks and a second gear, the plurality of outer disks may be engaged with the plurality of inner disks, and the second gear may be engaged with the first gear.

In any of the aspects or embodiments described above and herein, the first layshaft rotational axis, the first axis, and the second axis may be parallel.

In any of the aspects or embodiments described above and herein, the first variable drive assembly may further include a pivoting arm member, the radially fixed gear assembly and the radially variable gear assembly may be mounted on the pivoting arm member, and the pivoting arm member may be pivotable about the first axis.

In any of the aspects or embodiments described above and herein, the ring gear rotational control device may further include an actuator coupled with the pivoting arm member, and the actuator may be configured to pivot the arm member about the first axis.

In any of the aspects or embodiments described above and herein, the radially variable gear assembly may be pivotable about the first axis between a first radial position and a second radial position, the first variable drive assembly may have a first gear ratio with the radially variable gear assembly in the first radial position, and the first variable drive assembly may have a second gear ratio with the radially variable gear assembly in the second radial position.

In any of the aspects or embodiments described above and herein, the gearbox may further include a second layshaft assembly, the second layshaft assembly may extend along a second layshaft rotational axis and includes a second layshaft and a second layshaft input gear, the second layshaft input gear may be engaged with the drive gear and the input shaft.

In any of the aspects or embodiments described above and herein, the ring gear rotational control device may further include a second variable drive assembly coupled with the second layshaft, the second variable drive assembly may include a second ring gear drive engaged with the ring gear, the second ring gear drive may be rotatable about the second layshaft rotational axis, and the second variable drive assembly may be configured to drive rotation of the ring gear with the second ring gear drive.

In any of the aspects or embodiments described above and herein, the ring gear may include an inner diameter surface and an outer diameter surface, the plurality of planet gears may be engaged with the inner diameter surface, and the first ring gear drive may be engaged with the outer diameter surface.

In any of the aspects or embodiments described above and herein, the thermal engine may be a gas turbine engine including a power turbine shaft, and the power turbine shaft may be coupled with the input shaft.

According to another aspect of the present disclosure, an aircraft propulsion system includes a thermal engine, a gearbox, and a propulsion unit. The gearbox includes an input shaft, an output shaft, a drive gear, a ring gear, a first layshaft assembly, and a ring gear rotational control device. The input shaft is driven by the thermal engine. The drive gear and the ring gear are coupled with the output shaft. The drive gear, the ring gear, and the output shaft are rotatable about an output shaft rotational axis. The first layshaft assembly extends along a first layshaft rotational axis and including a first layshaft and a first layshaft input gear. The first layshaft input gear is engaged with the drive gear and the input shaft. The ring gear rotational control device includes a first variable drive assembly coupled with the first layshaft. The first variable drive assembly includes a first ring gear drive engaged with the ring gear. The first ring gear drive is rotatable about the first layshaft rotational axis. The first variable drive assembly is configured to drive rotation of the first ring gear drive with the first layshaft and drive rotation of the ring gear with the first ring gear drive. The propulsion unit is driven by the output shaft.

In any of the aspects or embodiments described above and herein, the first variable drive assembly may be configured to operate in a selected gear ratio of a continuous range of gear ratios between a maximum gear ratio of the first variable drive assembly and a minimum gear ratio of the first variable drive assembly, and the continuous range of gear ratios may be defined between the first layshaft and the first ring gear drive.

In any of the aspects or embodiments described above and herein, the first ring gear drive may circumscribe and be radially spaced from the first layshaft.

In any of the aspects or embodiments described above and herein, the first variable drive assembly may further include a plurality of inner disks and a pivoting arm assembly, the plurality of inner disks may be disposed on the first layshaft, the pivoting arm assembly may include a radially fixed gear assembly and a radially variable gear assembly, the radially fixed gear assembly may be rotatable about a first axis radially fixed relative to the first layshaft rotational axis, the radially fixed gear assembly may include a first gear engaged with the first ring gear drive, the radially variable gear assembly may be rotatable about a second axis radially moveable relative to the first layshaft rotational axis, the radially variable gear assembly may include a plurality of outer disks and a second gear, the plurality of outer disks may be engaged with the plurality of inner disks, and the second gear may be engaged with the first gear.

In any of the aspects or embodiments described above and herein, the radially variable gear assembly may be pivotable about the first axis between a first radial position and a second radial position, the first variable drive assembly may have a first gear ratio with the radially variable gear assembly in the first radial position, and the first variable drive assembly may have a second gear ratio with the radially variable gear assembly in the second radial position.

In any of the aspects or embodiments described above and herein, the gearbox may further include a second layshaft assembly, the second layshaft assembly may extend along a second layshaft rotational axis and may include a second layshaft and a second layshaft input gear, the second layshaft input gear may be engaged with the drive gear and the input shaft.

According to another aspect of the present disclosure, a method for driving a propulsion unit of an aircraft propulsion system includes driving an input shaft with a thermal engine, driving an output shaft about an output shaft rotational axis with an epicyclic gear arrangement coupled with the input shaft by a first layshaft assembly. The epicyclic gear arrangement includes a sun gear, a plurality of planet gears, a ring gear, and a carrier. The sun gear is coupled with the first layshaft assembly. The plurality of planet gears are engaged with the sun gear and the ring gear. The carrier is mounted on the plurality of planet gears. The carrier is connected to the output shaft. The method further includes driving the output shaft by driving the ring gear to rotate about the output shaft rotational axis with a ring gear rotational control device including a first variable drive assembly coupled between the first layshaft assembly and the ring gear. The first variable drive assembly includes a first ring gear drive engaged with the ring gear and rotatable about the first layshaft assembly. The method further includes driving the propulsion unit with the output shaft.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. The following description and drawings are intended to be exemplary in nature and non-limiting.

DETAILED DESCRIPTION

Figure 1:
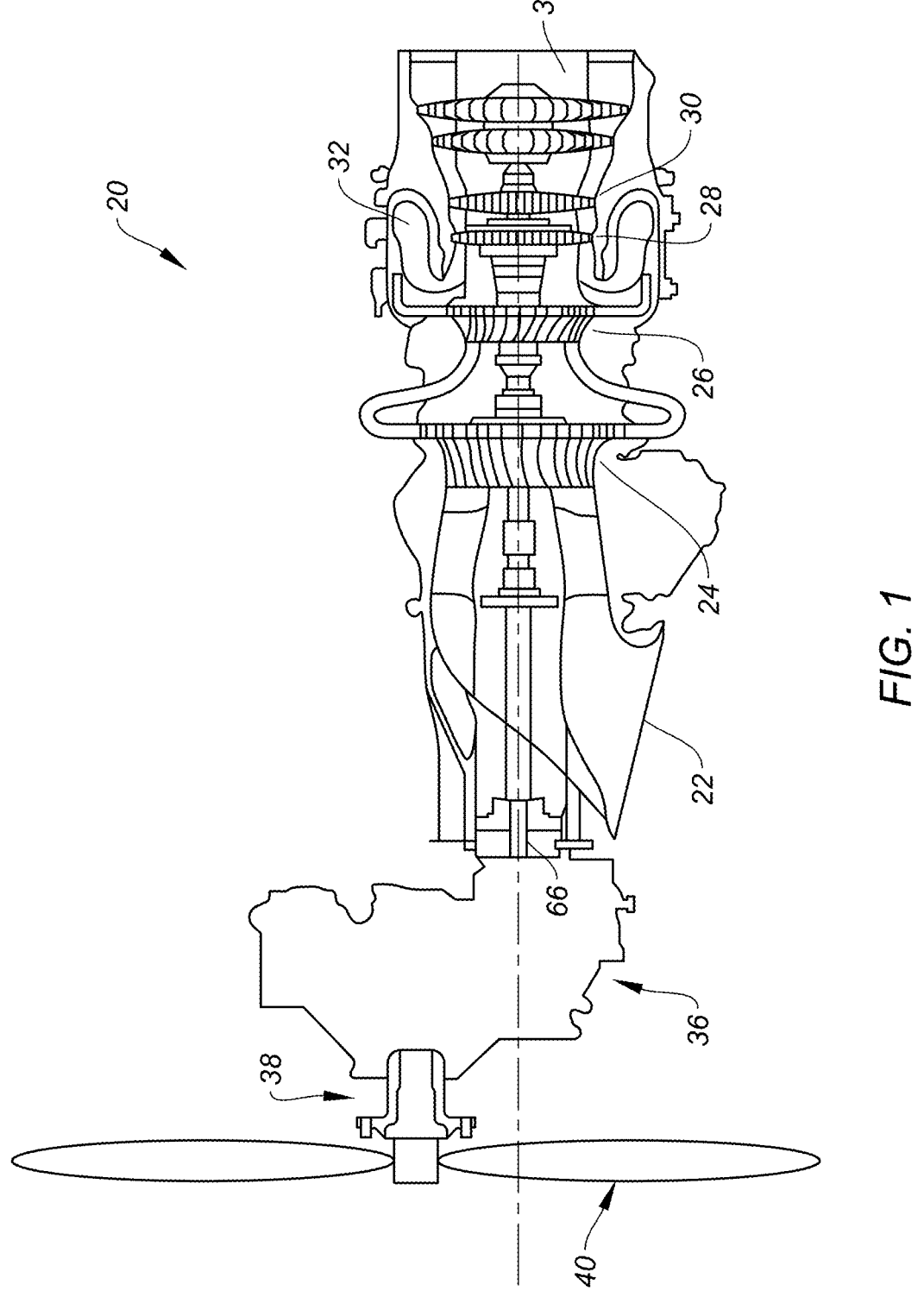
FIG. 1 schematically illustrates a cutaway, side view of an exemplary gas turbine engine with a gearbox and a propulsion unit, in accordance with one or more embodiments of the present disclosure.

FIG. 1 is a diagrammatic cross-sectional view of gas turbine engine 20 that includes an inlet duct 22, a low-pressure compressor 24, a high-pressure compressor 26, a high-pressure turbine 28, a low-pressure turbine 30, and a combustor 32. The gas turbine engine 20 also includes a power turbine 34. The present disclosure is not limited to the gas turbine engine 20 shown in FIG. 1 and may be used with other gas turbine engine 20 configurations or other thermal engine configurations. The gas turbine engine 20 is in communication with a gearbox 36. The gearbox 36 is in communication with a propulsion unit 38 that includes a propeller 40. The present disclosure is not limited to use with propulsion units 38 that include propellers 40.

The gearbox 36 may assume different configurations. The term "gearbox" as used herein may refer to a reduction gearbox that is configured to accept an input rotational drive at a first rotational speed (S1) and at a first torque (T1) and produce an output rotational drive at a second rotational speed (S2) and at a second torque (T2), wherein the first rotational speed is greater than the second rotational speed (S1>S2) and the second torque is greater than the first torque (T2>T1).

Figure 2:
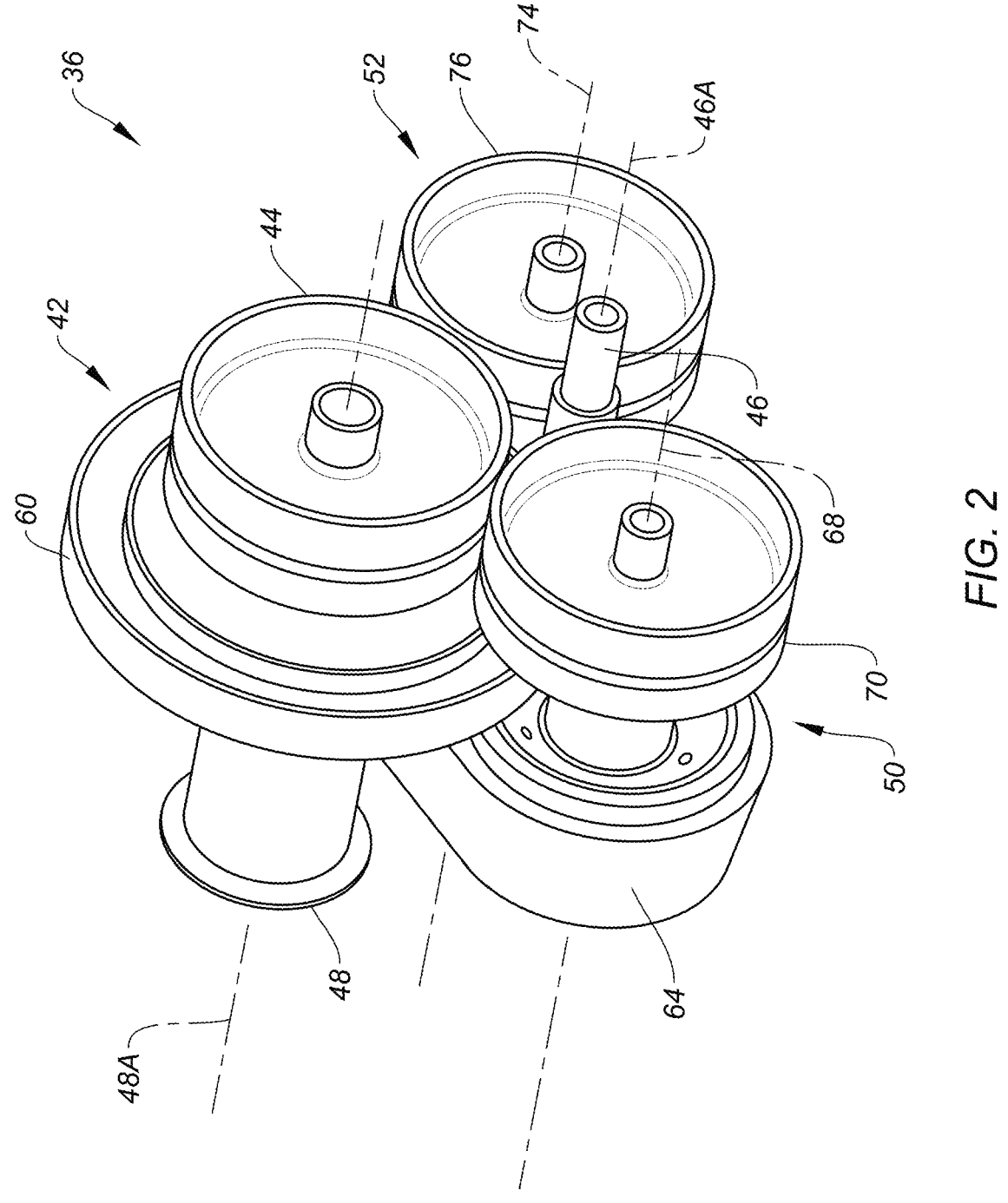
FIG. 2 schematically illustrates a perspective view of a reduction gearbox, in accordance with one or more embodiments of the present disclosure.
Figure 3:
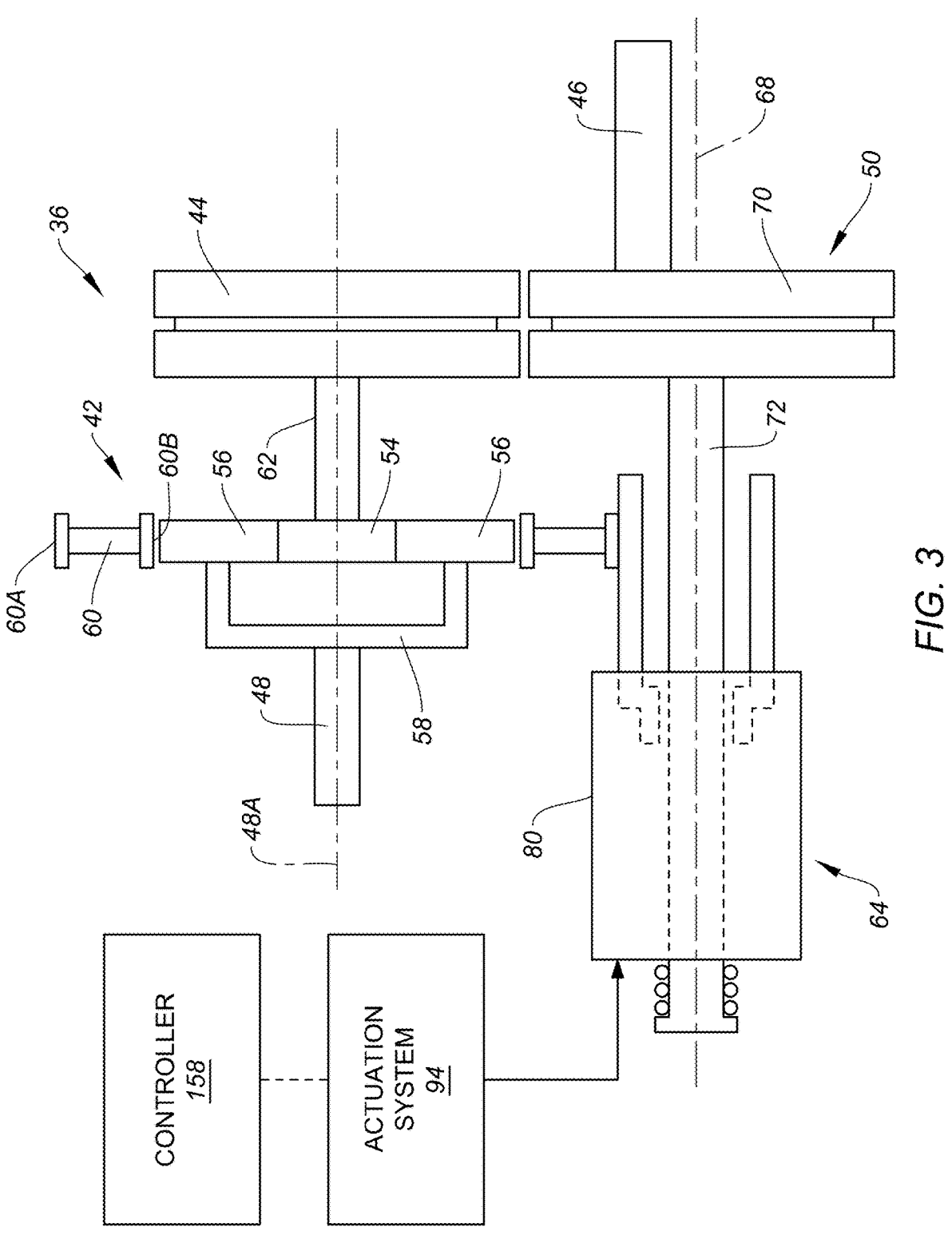
FIG. 3 schematically illustrates a cutaway, side view of the reduction gearbox, in accordance with one or more embodiments of the present disclosure.

The present disclosure gearbox 36 embodiment diagrammatically shown in FIGS. 2 and 3 is a variable-speed (e.g., an infinitely variable) reduction gearbox 36 that includes an epicyclic gear arrangement 42, a drive gear 44, an input shaft 46, an output shaft 48, a first layshaft assembly 50. The gearbox 36 of FIGS. 2 and 3 includes a second layshaft assembly 52; however, in some embodiments, the second layshaft assembly 52 may be omitted and the gearbox 36 may include a single layshaft assembly (e.g., the first layshaft assembly 50).

Figure 4:
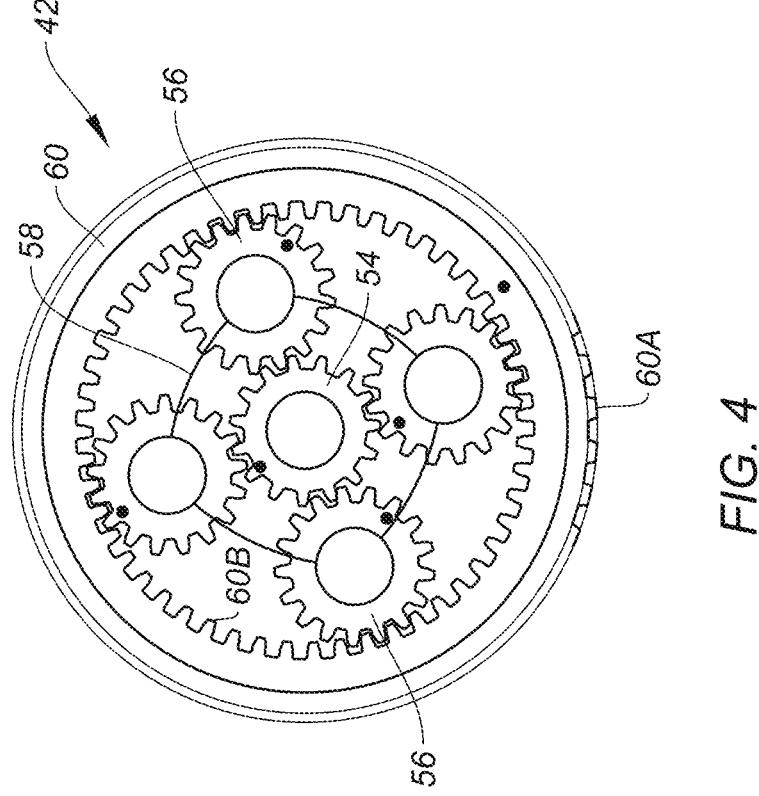
FIG. 4 schematically illustrates an epicyclic gear arrangement of the reduction gearbox, in accordance with one or more embodiments of the present disclosure.

Referring to FIG. 3, the epicyclic gear arrangement 42 includes a sun gear 54, a plurality of planet gears 56, a carrier 58, and a ring gear 60. A shaft 62 connects the sun gear 54 to the drive gear 44. A ring gear rotational control device 64 is shown in FIG. 3. The ring gear 60 is rotatable about an axis (e.g., the output shaft rotational axis 48A). The ring gear 60 has an outer diameter surface 60A configured with gear teeth, and an inner diameter surface 60B configured with gear teeth. The sun gear 54 is engaged with the planet gears 56 and the planet gears 56 are engaged with the gear teeth disposed on the inner diameter surface 60B of the ring gear 60. In the epicyclic gear arrangement 42 diagrammatically shown in FIG. 4, four planet gears 56 are shown engaged with the sun gear 54 and the ring gear 60. The present disclosure is not limited to any particular number of planet gears 56 in the epicyclic gear arrangement 42. The carrier 58 of the epicyclic gear arrangement 42 is connected to each of the planet gears 56 and is connected to the output shaft 48 of the gearbox 36. The output shaft 48 may be directly or indirectly connected to the propulsion unit 38 (see, e.g., FIG. 1). An example of a gearbox output shaft 48 that is directly engaged with the propulsion unit 38 is one wherein the gearbox output shaft 48 and the drive elements of the propulsion unit 38 (e.g., the propeller shaft) are connected to one another and rotate at the same speed. An example of a gearbox output shaft 48 that is indirectly engaged with the propulsion unit 38 is one wherein the gearbox output shaft 48 and the drive elements of the propulsion unit 38 (e.g., the propeller shaft) are both connected to a gear arrangement and the engine shaft and gearbox input shaft 46 rotate at different rotational speeds. The gearbox input shaft 46 is rotatable about an input shaft rotational axis 46A. The gearbox output shaft 48 is rotatable about an output shaft rotational axis 48A.

The gearbox input shaft 46 is directly or indirectly engaged with, and is driven by, the gas turbine engine 20. An example of a gearbox input shaft 46 that is directly engaged with the gas turbine engine 20 is one wherein the gearbox input shaft 46 is connected to an engine shaft and rotates at the same speed as the engine shaft. An example of a gearbox input shaft 46 that is indirectly engaged with the gas turbine engine 20 is one wherein the gearbox input shaft 46 and the engine shaft are both connected to a gear arrangement (not shown) and the engine shaft and gearbox input shaft 46 rotate at different rotational speeds. In the gas turbine engine 20 shown in FIG. 1, a shaft 66 extending from the power turbine 34 is an example of an engine shaft that may be directly or indirectly engaged with the gearbox input shaft 46. As will be detailed herein, the first layshaft assembly 50 and the second layshaft assembly 52 (see FIG. 2) are engaged with the gearbox input shaft 46.

The first layshaft assembly 50 is disposed along a first layshaft rotational axis 68 and includes a first layshaft input gear 70 and a first layshaft 72. The first layshaft input gear 70 is engaged with the gearbox input shaft 46. The first layshaft 72 is connected to the first layshaft input gear 70 and extends along the first layshaft rotational axis 68.

Figure 6:
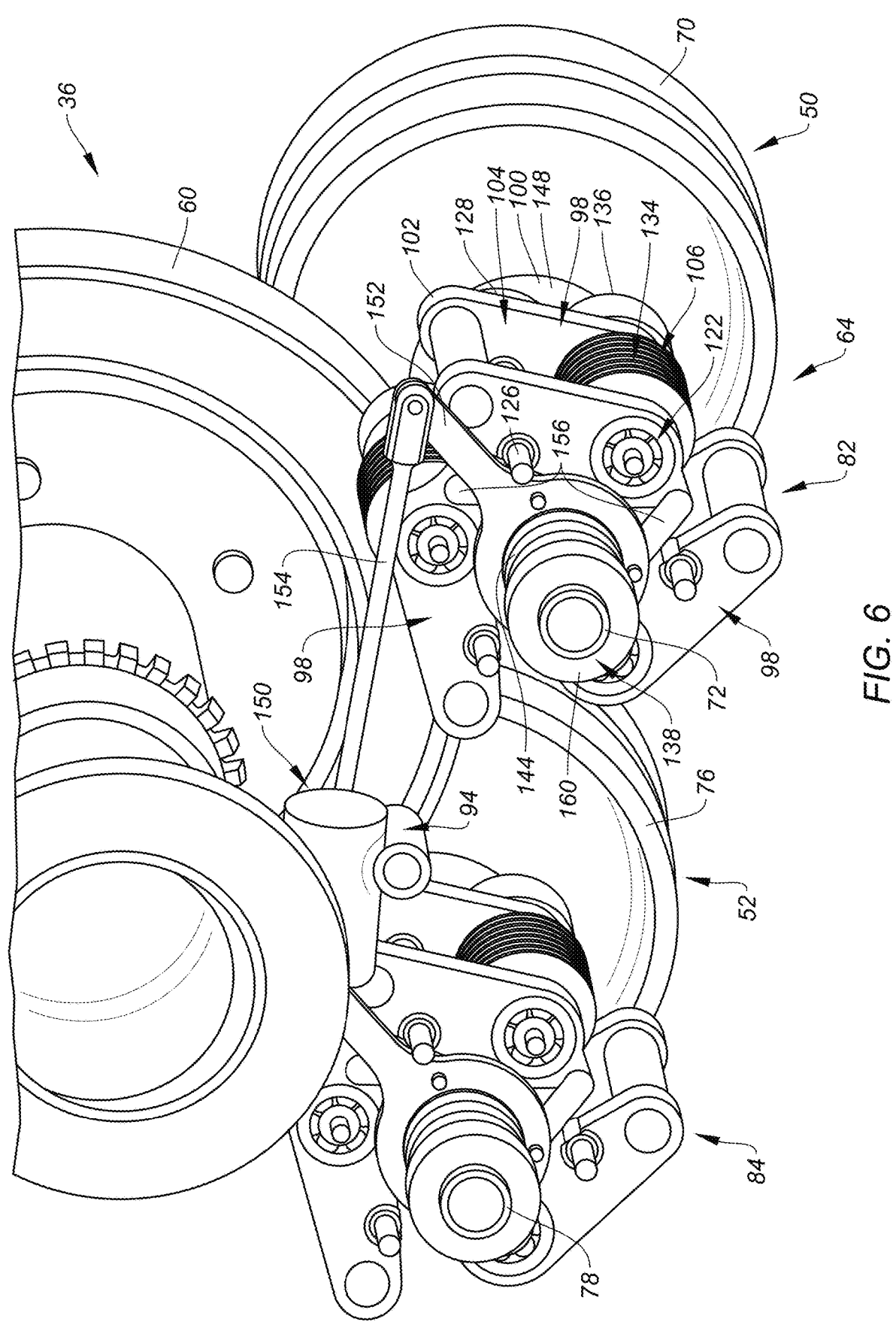
FIG. 6 illustrates another perspective view of a portion of the ring gear rotational control device, in accordance with one or more embodiments of the present disclosure.

In some embodiments, the second layshaft assembly 52 may be configured substantially the same as the first layshaft assembly 50, for example, configured such that the second layshaft assembly 52 is disposed along a second layshaft rotational axis 74 and includes a second layshaft input gear 76 and a second layshaft 78 (see FIG. 6 for second layshaft 78). The second layshaft input gear 76 is engaged with the gearbox input shaft 46. The second layshaft 78 is connected to the second layshaft input gear 76 and extends along the second layshaft rotational axis 74.

As detailed herein, gas turbine engines (e.g., a turboprop) very often have a range of rotational speeds in which the engine 20 has desirable efficiency and a range of rotational speeds in which the engine 20 has less than desirable efficiency. In many instances, it is desirable to have a propeller rotational speed that is less than the rotational speed of the engine 20 powering the propeller.

Embodiments of the present disclosure variable-speed gearbox 36 provide a structure that allows the gas turbine engine 20 to operate in a rotational speed range that is beneficial (e.g., efficient) for the gas turbine engine 20 and allows the propulsion system (e.g., the propeller) to be driven in a rotational speed range that provides a desired amount of thrust and an acceptable level of noise.

During the operation of a gas turbine engine 20 with a propulsion unit 38 and a present disclosure variable-speed gearbox 36, the gas turbine engine 20 drives the input shaft 46 of the gearbox 36. As indicated herein, a power turbine shaft 66 may directly or indirectly provide drive to the input shaft 46 of the gearbox 36. The input shaft 46 of the gearbox 36, in turn, drives the first and second layshaft assemblies 50, 52 (i.e., drives the first layshaft input gear 70 and the second layshaft input gear 76.

As detailed herein, the present disclosure variable-speed gearbox 36 may be controlled, by the ring gear rotational control device 64, to operated in a selected reduction gear ratio along a continuous (e.g., infinite) range of gear ratios between a minimum gear ratio and a maximum gear ratio. In a turboprop application, it may be desirable to operate the gearbox 36 at a higher reduction ratio during certain flight segments when a lower propeller speed may be desirable, for example, during a climb segment or a cruise segment. In a turboprop application, it may also be desirable to operate the gearbox 36 at a lower reduction ratio during certain flight segments when a higher propeller speed may be desirable, for example, during a takeoff segment. In any given, selected mode along the range of gear ratios of the variable-speed gearbox 36, the input shaft 46 of the gearbox 36 drives the first and second layshaft input gears 70, 76 which, in turn, drive the drive gear 44. The drive gear 44 is connected by shaft 62 with the sun gear 54 of the epicyclic gear arrangement 42. Hence, the drive gear 44 is driven and the drive gear 44, in turn, drives the sun gear 54, planet gears 56, and carrier 58 of the epicyclic gear arrangement 42. The drive gear 44 and the sun gear 54 may rotate about the output shaft rotational axis 48A.

Figure 5:
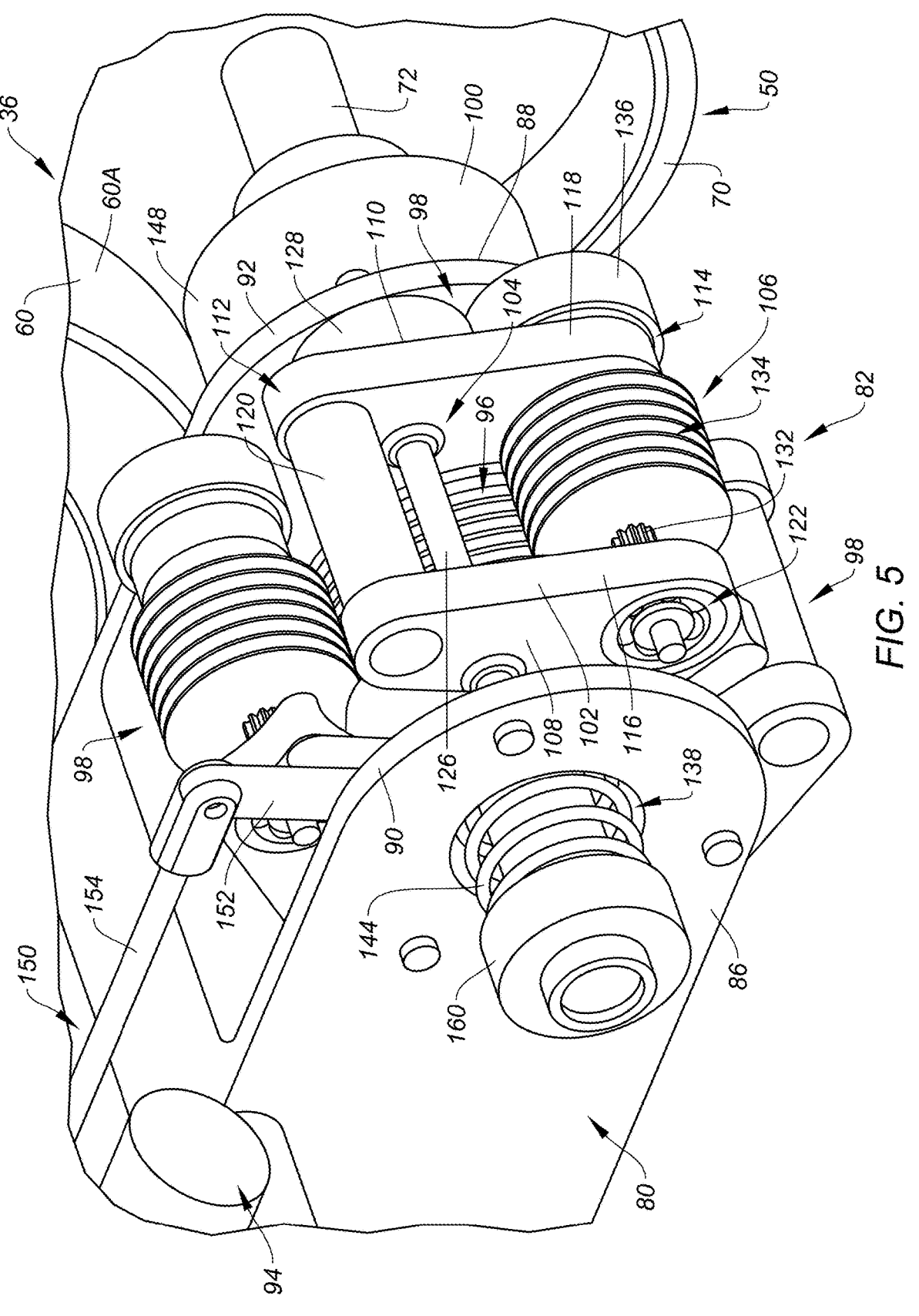
FIG. 5 illustrates a perspective view of a portion of a ring gear rotational control device of the reduction gearbox, in accordance with one or more embodiments of the present disclosure.
Figure 7:
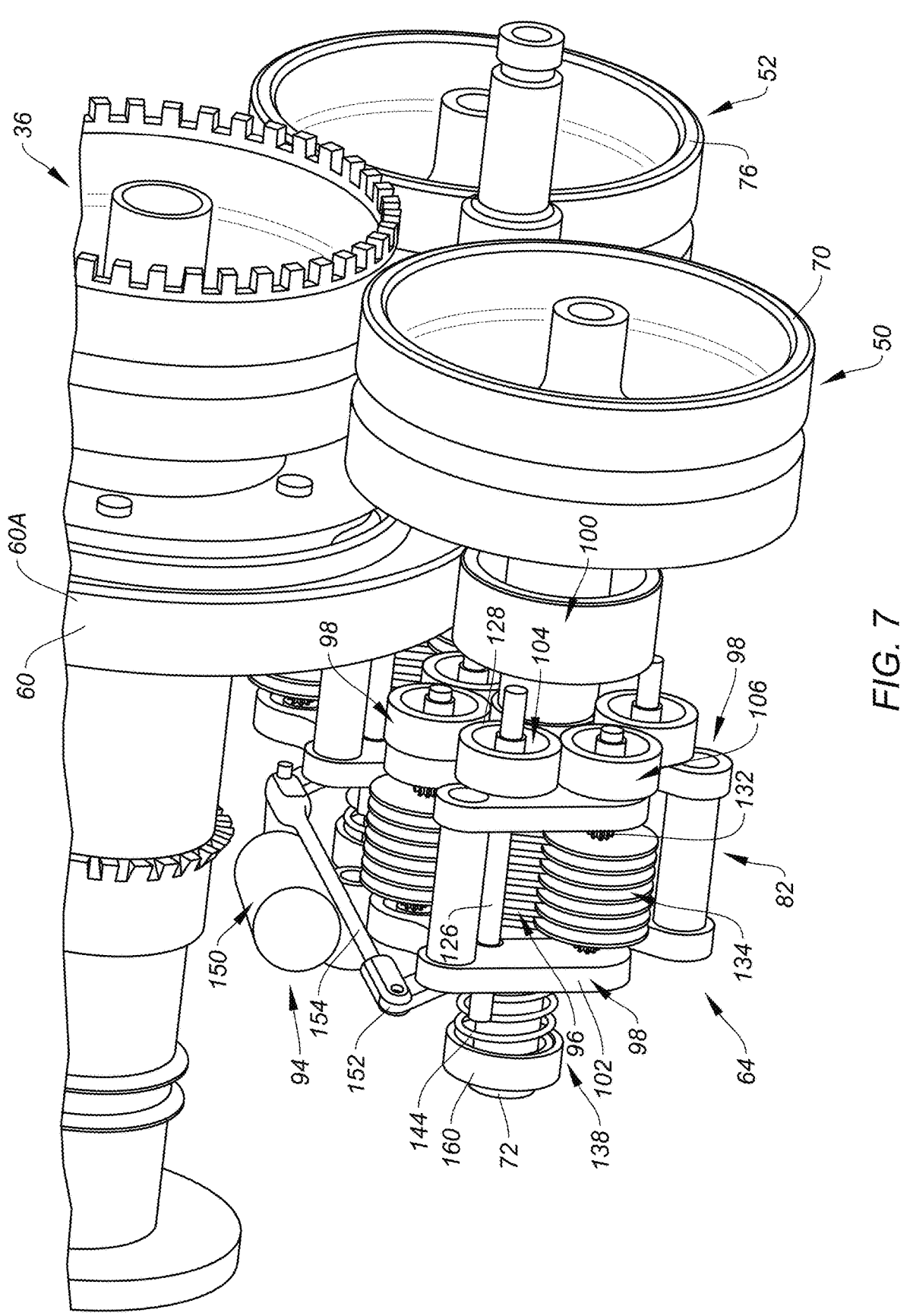
FIG. 7 illustrates another perspective view of a portion of the ring gear rotational control device, in accordance with one or more embodiments of the present disclosure.
Figures 8, 9:
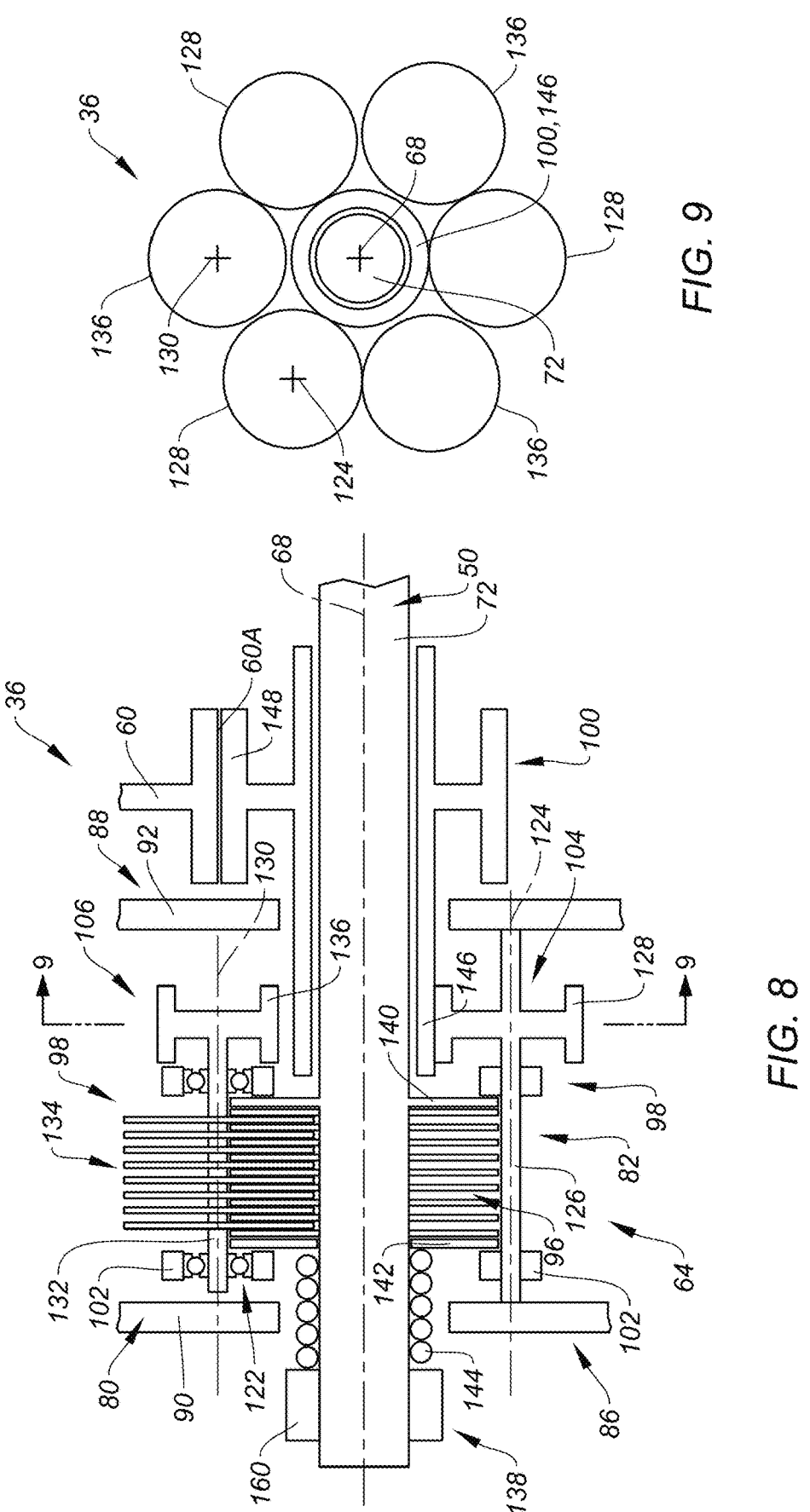
FIG. 8 schematically illustrates a cutaway, side view of a variable drive assembly of the ring gear rotational control device with a first gear ratio, in accordance with one or more embodiments of the present disclosure.
FIG. 9 schematically illustrates a cross-sectional view of the variable drive assembly of FIG. 8 taken along Line 9-9 of FIG. 8.
Figures 10, 11:
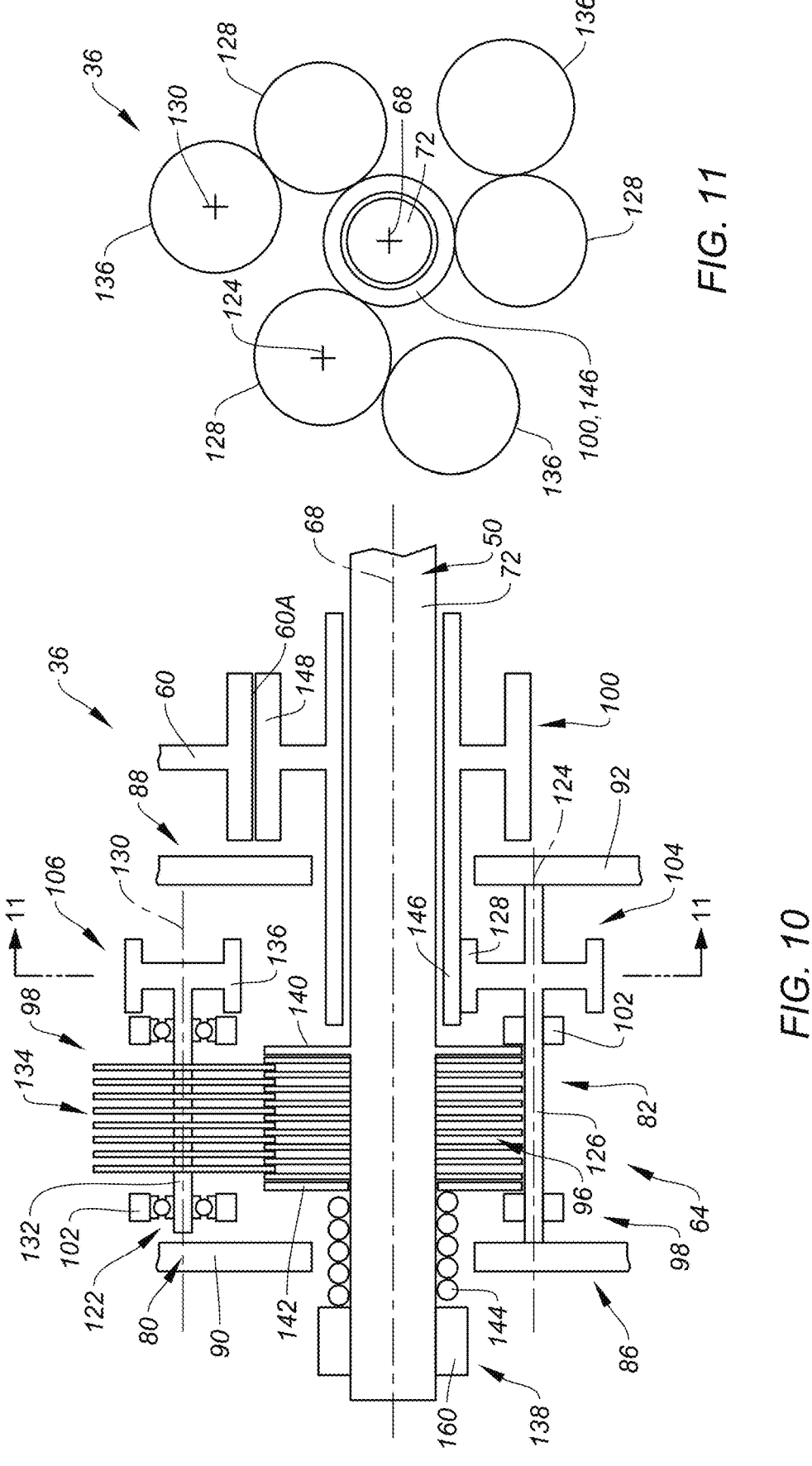
FIG. 10 schematically illustrates a cutaway, side view of the variable drive assembly with a second gear ratio, in accordance with one or more embodiments of the present disclosure.
FIG. 11 schematically illustrates a cross-sectional view of the variable drive assembly of FIG. 10 taken along Line 11-11 of FIG. 10.

FIGS. 5-7 illustrate various perspective views of the ring gear rotational control device 64. FIGS. 8 and 9 schematically illustrate components of the ring gear rotational control device 64 with a first gear ratio. FIGS. 10 and 11 schematically illustrate components of the ring gear rotational control device 64 with a second different gear ratio. The ring gear rotational control device 64 includes a housing 80, a first variable drive assembly 82, and an actuation system 94. The ring gear rotational control device 64 of FIGS. 2 and 3 includes a second variable drive assembly 84; however, in some embodiments, the second variable drive assembly 84 may be omitted and the ring gear rotational control device 64 may include a single variable drive assembly (e.g., the first variable drive assembly 82). The first variable drive assembly 82 and the second variable drive assembly 84 couple the first layshaft 72 and the second layshaft 78, respectively, with the ring gear 60.

The housing 80 houses and supports components of the first variable drive assembly 82 and the second variable drive assembly 84. The housing 80 extends relative to the first layshaft rotational axis 68 and the second layshaft rotational axis 74 between and to a first axial housing end 86 of the housing 80 and a second axial housing end 88 of the housing 80. The housing 80 of FIGS. 5, 8, and 10 includes a first housing endwall 90 at the first axial housing end 86 and a second housing endwall 92 at the second axial housing end 88. The housing 80 is omitted in FIGS. 6 and 7 to more clearly show the first variable drive assembly 82.

The first variable drive assembly 82 and the second variable drive assembly 84 each include a plurality of inner disks 96, a plurality of pivoting arm assemblies 98, and a ring gear drive 100. Components of the variable drive assemblies 82, 84, including the inner disks 96, the pivoting arm assemblies 98, and the ring gear drive 100 will be described with respect to the first variable drive assembly 82 and the first layshaft 72; however, it should be understood that this description is equally applicable to the second variable drive assembly 84 and the second layshaft 78.

The inner disks 96 are mounted on (e.g., fixedly mounted on) the first layshaft 72 within the housing 80. The inner disks 96 are arrayed axially along the first layshaft 72 relative to the first layshaft rotational axis 68. The inner disks 96 extend circumferentially about (e.g., completely around) the first layshaft 72 and the first layshaft rotational axis 68.

The pivoting arm assemblies 98 are disposed within the housing 80 and circumferentially arrayed about the first layshaft 72 and the first layshaft rotational axis 68. The pivoting arm assemblies 98 of FIGS. 5-11 include three pivoting arm assemblies 98; however, the present disclosure is not limited to this particular quantity of the pivoting arm assemblies 98. Each of the pivoting arm assemblies 98 includes an arm member 102, a radially fixed gear assembly 104, and a radially variable gear assembly 106, where the terms "radially fixed" and "radially variable" refer to radial positions of the radially fixed gear assembly 104 and the radially variable gear assembly 106, respectively, relative to the first layshaft rotational axis 68.

The arm member 102 extends between and to a first axial arm end 108 of the arm member 102 and a second axial arm end 110 of the arm member 102, relative to the first layshaft rotational axis 68. The arm member 102 further extends between and to first lateral arm end 112 of the arm member 102 and a second lateral arm end 114 of the arm member 102 in a direction generally orthogonal to an axial direction of the arm member 102 extending between the first axial arm end 108 and the second axial arm end 110. A lateral direction of the arm member 102, extending between the first lateral arm end 112 and the second lateral arm end 114, may be oriented generally tangential relative to the first layshaft rotational axis 68. The arm member 102 includes a first axial endwall 116 at the first axial arm end 108 and a second axial endwall 118 at the second axial arm end 110. The first axial endwall 116 is axially spaced from the second axial endwall 118. The arm member 102 may additionally include an axially-extending segment 120 extending axially between and connecting the first axial endwall 116 and the second axial endwall 118. For example, the axially-extending segment 120 of FIGS. 5-7 extends between the first axial endwall 116 and the second axial endwall 118 along the first lateral arm end 112. The arm member 102 is pivotably mounted to the housing 80 by the radially fixed gear assembly 104. The arm member 102 may include bearings 122 at the first axial endwall 116 and the second axial endwall 118 in rotational engagement with the radially fixed gear assembly 104 and/or the radially variable gear assembly 106.

The radially fixed gear assembly 104 extends along and is rotatable about a rotational axis 124. The rotational axis 124 is parallel to or substantially parallel to the first layshaft rotational axis 68. The arm member 102 is pivotably mounted on the radially fixed gear assembly 104 and pivotable about the radially fixed gear assembly 104 and its rotational axis 124. The radially fixed gear assembly 104 includes a shaft 126 and a gear 128. The shaft 126 is mounted on the housing 80 for rotation about the rotational axis 124. For example, the shaft 126 extends (e.g., along the rotational axis 124) between and is rotatable mounted to the first housing endwall 90 and the second endwall 92. The gear 128 is mounted (e.g., fixedly mounted) on the shaft 126. The gear 128 is disposed axially outside of the arm member 102, for example, at (e.g., on, adjacent, or proximate) the second axial arm end 110. The radially fixed gear assembly 104 is disposed laterally between the first lateral arm end 112 and the radially variable gear assembly 106.

The radially variable gear assembly 106 extends along and is rotatable about a rotational axis 130. The rotational axis 130 is parallel to or substantially parallel to the first layshaft rotational axis 68 and the rotational axis 124. The radially variable gear assembly 106 includes a shaft 132, a plurality of outer disks 134, and a gear 136. The shaft 132 is mounted on the arm member 102 for rotation about the rotational axis 130. For example, the shaft 132 extends (e.g., along the rotational axis 130) between and is rotatable mounted to the first axial end wall 116 and the second axial end wall 118. The radially variable gear assembly 106 is pivotable with the arm member 102 about the radially fixed gear assembly 104 and its rotational axis 124. The outer disks 134 are mounted on (e.g., fixedly mounted on) the shaft 132. The outer disks 134 are arrayed axially along the shaft 132 relative to the rotational axis 130. The outer disks 134 extend circumferentially about (e.g., completely around) the shaft 132 and the rotational axis 130. The outer disks 134 are disposed axially between the first axial end wall 116 and the second axial end wall 118. The outer disks 134 are intermeshed with the inner disks 96. The outer disks 134 are radially moveable relative to the inner disks 96 with respect to the first layshaft rotational axis 68 to vary a radial overlap of the outer disks 134 with the inner disks 96. The gear 136 is mounted (e.g., fixedly mounted) on the shaft 132. The gear 136 is disposed axially outside of the arm member 102, for example, at (e.g., on, adjacent, or proximate) the second axial arm end 110. The gear 136 is engaged with (e.g., meshed with) the gear 128. The radially variable gear assembly 106 is disposed laterally between the second lateral arm end 114 and the radially fixed gear assembly 104.

The inner disks 96 and the outer disks 134 may be axially compressed together by a biasing assembly 138 mounted on the first layshaft 72. The biasing assembly 138 of FIGS. 5-8 and 10 includes a fixed axial plate 140, a moveable axial plate 142, and a spring 144. The inner disks 96 and the outer disks 134 are axially compressed together between the fixed axial plate 140 and the moveable axial plate 142. The fixed axial plate 140 and the moveable axial plate 142 are disposed at and extending circumferentially about the first layshaft 72. The fixed axial plate 140 may be mounted to or formed by the first layshaft 72. The moveable axial plate 142 is moveable along the first layshaft 72 and the first layshaft rotational axis 68 to compress the inner disks 96 and the outer disks 134 between the fixed axial plate 140 and the moveable axial plate 142. The spring 144 is arranged circumferentially about the first layshaft 72. The spring 144 is axially compressed between the moveable axial plate 142 and a ring 160 fixedly mounted on the first layshaft 72. The compression of the spring 144 between the moveable axial plate 142 and the ring 160 biases the moveable axial plate 142 toward the fixed axial plate 140 compressing the inner disks 96 and the outer disks 134 together axially therebetween.

The ring gear drive 100 extends circumferentially about the first layshaft 72 and the first layshaft rotational axis 68. The ring gear drive 100 is rotatable about the first layshaft rotational axis 68. The ring gear drive 100 is radially spaced from the first layshaft 72 such that the ring gear drive 100 does not directly engage (e.g., contact) the first layshaft 72. The ring gear drive 100 includes an input gear 146 and an output gear 148. The input gear 146 is engaged (e.g., meshed) with the gear 128 of the radially fixed gear assembly 104 of each of the pivoting arm assemblies 98. The input gear 146 is radially spaced from (e.g., does not directly engage) the gear 136 of the radially variable gear assembly 106 of each of the pivoting arm assemblies 98, relative to the first layshaft axis 68. The input gear 146 may be disposed within the housing 80, for example, axially between the disks 96, 134 and the second housing endwall 92. The output gear 148 is engaged (e.g., meshed) with the ring gear 60 (e.g., the outer diameter surface 60A). The output gear 148 is disposed outside of the housing 80.

With additional reference to FIG. 3, the actuation system 94 is configured to effect pivoting of each of the pivoting arm assemblies 98 about their respective rotational axis 124 to facilitate selectively radially positioning the outer disks 134 relative to the inner disks 96. The actuation system 94 of FIGS. 5-7 includes a linear actuator 150 and an actuation ring 152. The present disclosure, however, is not limited to the exemplary actuation system 94 of FIGS. 5-7 for actuating the pivoting arm assemblies 98 of the first variable drive assembly 82 (and the second variable drive assembly 84). The linear actuator 150 may be hydraulically powered. The linear actuator 150 includes a rod 154 connected to the actuation ring 152. The actuation ring 152 is rotatably mounted on the first layshaft 72, for example, at the first axial arm end 108 of each of the pivoting arm assemblies 98. The actuation ring 152 is coupled with the arm member 102 of each of the pivoting arm assemblies 98 by a respective linkage 156. The linear actuator 150 is configured to move (e.g., linearly actuate) the rod 154 to pivot the actuation ring 152 and, thereby, effect pivoting of each of the pivoting arm assemblies 98.

In operation, the gas turbine engine 20 (e.g., the power turbine shaft 66) drives the gearbox input shaft 46 and the gearbox input shaft 46 drives both the first and second layshaft assemblies 50, 52 (i.e., drives the first layshaft input gear 70 and the second layshaft input gear 76). The first and second layshaft input gears 70, 76, in turn, drive the drive gear 44. The drive gear 44 is connected to the sun gear 54 of the epicyclic gear arrangement 42. The first and second layshaft input gears 70, 76 drive the drive gear 44, and the drive gear 44 drives the sun gear 54, planet gears 56, and carrier 58 of the epicyclic gear arrangement 42. The carrier 58 drives the gearbox output shaft 48, which in turn drives the propulsion unit 38.

The first and second layshaft assemblies 50, 52 further drive the first and second variable drive assemblies 82, 84, respectively, of the ring gear rotational control device 64. Using the first layshaft 72 and the first variable drive assembly 82 as an example, the inner disks 96 rotate with the first layshaft 72 about the first layshaft rotational axis 68. The inner disks 96 drive the outer disks 134 of each of the pivoting arm assemblies 98 causing the respective radially variable gear assembly 106 of each of the pivoting arm assemblies 98 to rotate about the rotational axis 130. The gear 136 of the radially variable gear assembly 106 drives the gear 128 of the radially fixed gear assembly 104 (e.g., about its rotational axis 124) which, in turn, drives the ring gear drive 100. The ring gear drive 100 causes the ring gear 60 to rotate, and the rotation of the ring gear 60 causes the carrier 58 of the epicyclic gear arrangement 42 to rotate faster than it would if the ring gear 60 was stationary.

The radial position of the outer disks 134 relative to the inner disks 96, with respect to the first layshaft axis 68, controls a rotation speed of the ring gear 60 relative to the gearbox input shaft 46 which, in turn, controls a rotation speed of the gearbox output shaft 48 and the propulsion unit 38 relative to the gearbox input shaft 46. Thus, the variable drive assemblies 82, 84 are configured to operate in a selected gear ratio of a continuous range of gear ratios between a maximum gear ratio and a minimum gear ratio. The maximum gear ratio may be greater than about 2:1, for example, approximately 3:1. The minimum gear ratio may be less than about 2:1, for example, approximately 1:1. The present disclosure, however, is not limited to any particular continuous gear ratio range of the variable drive assemblies 82, 84.

As the pivoting arm assemblies 98 pivot to move the outer disks 134 radially inward, an effective radius of the outer disks 134 deceases and a gear ratio of the first variable drive assembly 82 increases. FIGS. 8 and 9 schematically illustrate the outer disks 134 in a radially inner position (e.g., an innermost position) relative to the inner disks 96. In this radially inner position, the first variable drive assembly 82 may be operated at the maximum gear ratio between the first layshaft 72 and the ring gear drive 100, thereby driving rotation of the ring gear 60 (e.g., about the output shaft rotational axis 48A) at a maximum rotation speed relative to the gearbox input shaft 46 rotation speed and facilitating a maximum reduction ratio of the gearbox 36 within the variable range of the first variable drive assembly 82.

As the pivoting arm assemblies 98 pivot to move the outer disks 134 radially outward, an effective radius of the outer disks 134 increases and the gear ratio of the first variable drive assembly 82 decreases. FIGS. 10 and 11 schematically illustrate the outer disks 134 in a radially outer position (e.g., an outermost position) relative to the inner disks 96. In this radially outer position, the first variable drive assembly 82 may be operated at the minimum gear ratio between the first layshaft 72 and the ring gear drive 100, thereby driving rotation of the ring gear 60 (e.g., about the output shaft rotational axis 48A) at a minimum rotation speed relative to the gearbox input shaft 46 rotation speed and facilitating a minimum reduction ratio of the gearbox 36 within the variable range of the first variable drive assembly 82.

Referring to FIG. 3, in some embodiments the present disclosure system may include a controller 158 or be implemented using a controller 158 (e.g., a "shared controller" dedicated to perform other functionality as well as the functionality described herein). A non-limiting example of a "shared controller" is the electronic engine control (EEC). Regardless of whether a dedicated controller or a "shared controller" is used, the controller 158 is in communication with other system components such as the actuation system 94 to control, by the actuation system 94, radial positions of the outer disks 134 relative to the inner disks 96 so as to control a reduction ratio of the gearbox 36, as described above. The controller 158 may include one or more of any type of computing device, computational circuit, processor (s), CPU, computer, or the like (collectively referred to as a "control device") capable of executing a series of instructions that are stored in memory. In those embodiments wherein the controller 158 includes more than one control device, the control devices may be in communication with one another and may be disposed in any architecture that is capable of achieving the functionality described herein. The instructions may include an operating system, and/or executable software modules such as program files, system data, buffers, drivers, utilities, and the like. The executable instructions may apply to any functionality described herein to enable the inspection system to accomplish the same algorithmically and/or coordination of system components. The controller 158 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The controller 158 may include, or may be in communication with, an input device (not shown) that enables a user to enter data and/or instructions, and may include, or be in communication with, an output device configured, for example to display information (e.g., a visual display, or the like), or to transfer data, etc. Communications between the controller 158 and other system components may be via a hardwire connection or via a wireless connection.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An aircraft propulsion system, comprising:
a thermal engine;
a gearbox including an input shaft, an output shaft, an epicyclic gear arrangement, a drive gear, a first layshaft assembly, and a ring gear rotational control device, the input shaft driven by the thermal engine,
   the epicyclic gear arrangement including a sun gear, a plurality of planet gears, a ring gear, and a carrier, the sun gear connected to the drive gear, the plurality of planet gears engaged with the sun gear and the ring gear, the carrier mounted on the plurality of planet gears, the carrier connected to the output shaft,
   the first layshaft assembly extending along a first layshaft rotational axis and including a first layshaft and a first layshaft input gear, the first layshaft input gear engaged with the drive gear and the input shaft, and
   the ring gear rotational control device including a first variable drive assembly coupled with the first layshaft, the first variable drive assembly including a first ring gear drive engaged with the ring gear, the first ring gear drive rotatable about the first layshaft rotational axis, the first variable drive assembly configured to drive rotation of the ring gear with the first ring gear drive; and
a propulsion unit driven by the output shaft.

2. The aircraft propulsion system of claim 1, wherein the first variable drive assembly is configured to operate in a selected gear ratio of a continuous range of gear ratios between a maximum gear ratio of the first variable drive assembly and a minimum gear ratio of the first variable drive assembly, and the continuous range of gear ratios is defined between the first layshaft and the first ring gear drive.

3. The aircraft propulsion system of claim 2, wherein the maximum gear ratio is greater than 2:1 and the minimum gear ratio is less than 2:1.

4. The aircraft propulsion system of claim 1, wherein the first ring gear drive circumscribes and is radially spaced from the first layshaft.

5. The aircraft propulsion system of claim 1, wherein the first variable drive assembly further includes a plurality of inner disks and a pivoting arm assembly, the plurality of inner disks is disposed on the first layshaft, the pivoting arm assembly includes a radially fixed gear assembly and a radially variable gear assembly, the radially fixed gear assembly is rotatable about a first axis radially fixed relative to the first layshaft rotational axis, the radially fixed gear assembly includes a first gear engaged with the first ring gear drive, the radially variable gear assembly is rotatable about a second axis radially moveable relative to the first layshaft rotational axis, the radially variable gear assembly includes a plurality of outer disks and a second gear, the plurality of outer disks are engaged with the plurality of inner disks, and the second gear is engaged with the first gear.

6. The aircraft propulsion system of claim 5, wherein the first layshaft rotational axis, the first axis, and the second axis are parallel.

7. The aircraft propulsion system of claim 5, wherein the first variable drive assembly further includes a pivoting arm member, the radially fixed gear assembly and the radially variable gear assembly are mounted on the pivoting arm member, and the pivoting arm member is pivotable about the first axis.

8. The aircraft propulsion system of claim 7, wherein the ring gear rotational control device further includes an actuator coupled with the pivoting arm member, and the actuator is configured to pivot the arm member about the first axis.

9. The aircraft propulsion system of claim 5, wherein the radially variable gear assembly is pivotable about the first axis between a first radial position and a second radial position, the first variable drive assembly has a first gear ratio with the radially variable gear assembly in the first radial position, and the first variable drive assembly has a second gear ratio with the radially variable gear assembly in the second radial position.

10. The aircraft propulsion system of claim 1, wherein the gearbox further includes a second layshaft assembly, the second layshaft assembly extends along a second layshaft rotational axis and includes a second layshaft and a second layshaft input gear, the second layshaft input gear is engaged with the drive gear and the input shaft.

11. The aircraft propulsion system of claim 10, wherein the ring gear rotational control device further includes a second variable drive assembly coupled with the second layshaft, the second variable drive assembly includes a second ring gear drive engaged with the ring gear, the second ring gear drive is rotatable about the second layshaft rotational axis, and the second variable drive assembly is configured to drive rotation of the ring gear with the second ring gear drive.

12. The aircraft propulsion system of claim 1, wherein the ring gear includes an inner diameter surface and an outer diameter surface, the plurality of planet gears are engaged with the inner diameter surface, and the first ring gear drive is engaged with the outer diameter surface.

13. The aircraft propulsion system of claim 1, wherein the thermal engine is a gas turbine engine including a power turbine shaft, and the power turbine shaft is coupled with the input shaft.

14. An aircraft propulsion system, comprising:
a thermal engine;
a gearbox that includes an input shaft, an output shaft, a drive gear, a ring gear, a first layshaft assembly, and a ring gear rotational control device, the input shaft driven by the thermal engine, the drive gear and the ring gear coupled with the output shaft, the drive gear, the ring gear, and the output shaft rotatable about an output shaft rotational axis,
   the first layshaft assembly extending along a first layshaft rotational axis and including a first layshaft and a first layshaft input gear, the first layshaft input gear engaged with the drive gear and the input shaft, and the ring gear rotational control device including a first variable drive assembly coupled with the first layshaft, the first variable drive assembly including a first ring gear drive engaged with the ring gear, the first ring gear drive rotatable about the first layshaft rotational axis, the first variable drive assembly configured to drive rotation of the first ring gear drive with the first layshaft and drive rotation of the ring gear with the first ring gear drive; and a propulsion unit driven by the output shaft.

15. The aircraft propulsion system of claim 14, wherein the first variable drive assembly is configured to operate in a selected gear ratio of a continuous range of gear ratios between a maximum gear ratio of the first variable drive assembly and a minimum gear ratio of the first variable drive assembly, and the continuous range of gear ratios is defined between the first layshaft and the first ring gear drive.

16. The aircraft propulsion system of claim 14, wherein the first ring gear drive circumscribes and is radially spaced from the first layshaft.

17. The aircraft propulsion system of claim 14, wherein the first variable drive assembly further includes a plurality of inner disks and a pivoting arm assembly, the plurality of inner disks is disposed on the first layshaft, the pivoting arm assembly includes a radially fixed gear assembly and a radially variable gear assembly, the radially fixed gear assembly is rotatable about a first axis radially fixed relative to the first layshaft rotational axis, the radially fixed gear assembly includes a first gear engaged with the first ring gear drive, the radially variable gear assembly is rotatable about a second axis radially moveable relative to the first layshaft rotational axis, the radially variable gear assembly includes a plurality of outer disks and a second gear, the plurality of outer disks are engaged with the plurality of inner disks, and the second gear is engaged with the first gear.

18. The aircraft propulsion system of claim 17, wherein the radially variable gear assembly is pivotable about the first axis between a first radial position and a second radial position, the first variable drive assembly has a first gear ratio with the radially variable gear assembly in the first radial position, and the first variable drive assembly has a second gear ratio with the radially variable gear assembly in the second radial position.

19. The aircraft propulsion system of claim 14, wherein the gearbox further includes a second layshaft assembly, the second layshaft assembly extends along a second layshaft rotational axis and includes a second layshaft and a second layshaft input gear, the second layshaft input gear is engaged with the drive gear and the input shaft.

20. A method for driving a propulsion unit of an aircraft propulsion system, the method comprising:

driving an input shaft with a thermal engine;

driving an output shaft about an output shaft rotational axis with an epicyclic gear arrangement coupled with the input shaft by a first layshaft assembly, the epicyclic gear arrangement including a sun gear, a plurality of planet gears, a ring gear, and a carrier, the sun gear coupled with the first layshaft assembly, the plurality of planet gears engaged with the sun gear and the ring gear, the carrier mounted on the plurality of planet gears, the carrier connected to the output shaft;

further driving the output shaft by driving the ring gear to rotate about the output shaft rotational axis with a ring gear rotational control device including a first variable drive assembly coupled between the first layshaft assembly and the ring gear, the first variable drive assembly including a first ring gear drive engaged with the ring gear and rotatable about the first layshaft assembly; and driving the propulsion unit with the output shaft.

* * * * *